May 31, 1960 S. E. GENT 2,938,950

AUTOMATIC GAIN CONTROL CIRCUITS FOR TELEVISION SIGNAL AMPLIFIERS

Filed Feb. 1, 1955

INVENTOR
STANLEY ERIC GENT

BY
[signature]
ATTORNEY

United States Patent Office 2,938,950

Patented May 31, 1960

2,938,950

AUTOMATIC GAIN CONTROL CIRCUITS FOR TELEVISION SIGNAL AMPLIFIERS

Stanley Eric Gent, London, England, assignor to Ferguson Radio Corporation Limited, London, England Filed Feb. 1, 1955, Ser. No. 485,526

2 Claims. (Cl. 178—7.3)

Figure 1:
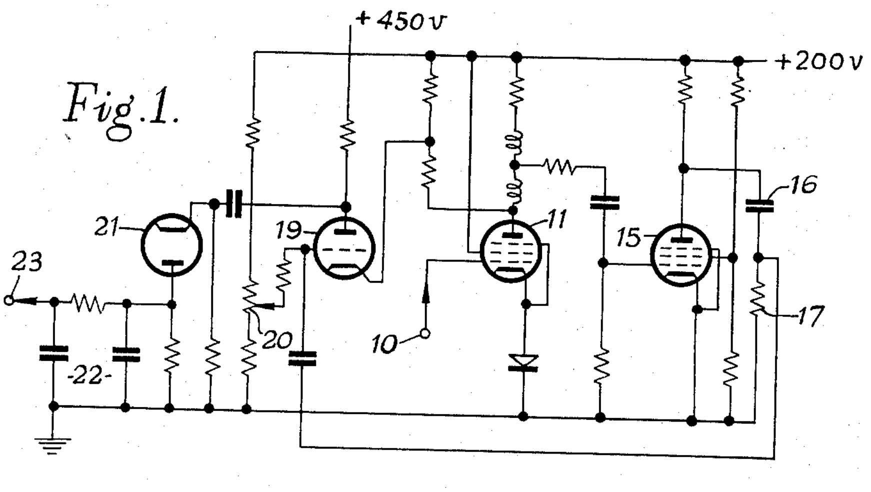

The present invention relates to automatic gain control circuits for television signal amplifiers. It is particularly concerned with apparatus for handling television signals transmitted with positive modulation, that is to say a modulation in which the amplitude of the radio frequency carrier is increased with picture brightness and decreased in response to synchronising signals. An example is the 405 line system at present in use in this country. The invention is, however, applicable to systems using negative modulation.

For the purpose of automatic gain control (AGC) it is known to make use of variations in the blanking level in television signals relatively to a datum level. The blanking level which is usually referred to as the "back-porch" in television signals employing positive modulation is the level which occurs in the time interval immediately after each line synchronising pulse or frame synchronising or equalising pulse. In order to make use of this blanking level it is necessary to sample or strobe the signal waveform during blanking intervals, namely the time intervals immediately following the line and frame synchronising pulses and equalising pulses, and for this purpose use is made of keying pulses.

In known arrangements in television receivers the keying pulses have been derived from the line or frame time base waveform. One of the disadvantages of this is that if the time base concerned becomes unsynchronised, for any reason, the AGC voltage is likely to change and the contrast level of the receiver changes correspondingly. It is then diffiicult for an inexperienced user to determine the correct adjustment of the contrast level or time base frequency.

A further disadvantage of the known arrangements referred to is that no AGC information is given during the frame synchronising intervals and consequently the AGC voltage generated has a 50 c./s. component and a filter having a relatively long time constant has to be used in order to smooth the AGC voltage. Rapid fading is often caused by aircraft and other moving objects and in order to correct such fading it is necessary that the time constant of the filter employed for smoothing the AGC voltage should be relatively short.

The present invention has for its object to provide an AGC circuit for television signal amplifiers in which the disadvantages referred to are removed or at least substantialy reduced.

According to the present invention an automatic gain control circuit comprises means adapted, when actuated, to generate an atuomatic gain control voltage dependent upon the blanking level of television signals, and means for generating keying pulses occurring during the blanking intervals from the line synchronising pulses of the television signals and independently of the time base circuits, and for applying these keying pulses to actuate the first-named means.

The keying pulses may be generated, by means of a differentiating circuit, from the trailing edges of the line synchronising pulses.

The invention will be described, by way of example, with reference to the accompanying drawing in which Fig. 1 is a circuit diagram of an embodiment of the invention suitable for use in a 405 line, positive modulation system, and Fig. 2 contains waveforms illustrating the operation of the circuit of Fig. 1.

Referring to Fig. 1, television signals are applied through a terminal 10 to the control grid of a pentode 11. The voltage at the anode of pentode 11 has a waveform such as is shown at (*a*) in Fig. 2, this waveform being everywhere more negative than a reference level $v_0$ which is the voltage at the anode of the pentode 11 in the absence of a signal at the terminal 10. The voltage $v_1$ at the peaks of the line synchronising or sync pulses 12 is usually very close to $v_0$ (it may differ, for example, by about 3% of the peak white signal amplitude) and the difference between $v_1$ and $v_0$ corresponds to the residual carrier transmitted when the carrier amplitude reaches its minimum value. The blanking or reference level $v_2$ over the interval 13 may therefore be taken, without appreciable error, as a measure of the signal strength, and is, of course, independent of the picture modulation 14.

Figure 2:
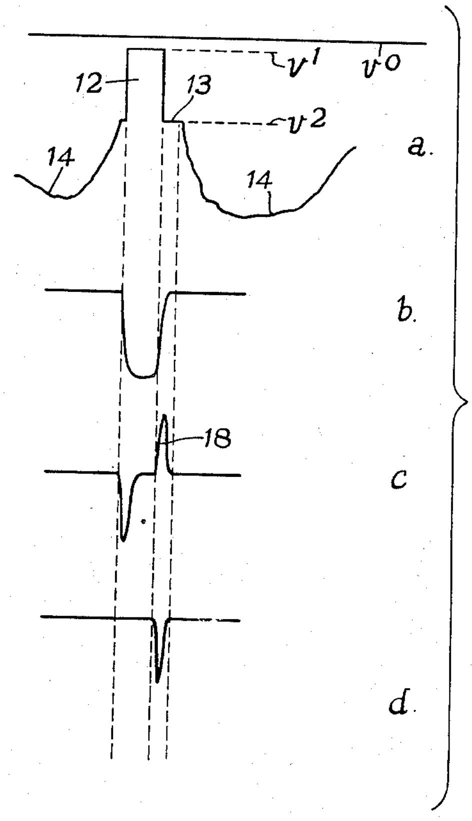

The voltage at the anode of pentode 11 is applied to a synchronising signal separator including a pentode 15, synchronising pulses of the form shown in Fig. 2(*b*) appearing at the anode of this pentode separated from the video signals. In the anode circuit of the pentode 15 is a differentiating circuit 16, 17 which converts the waveform of Fig. 2(*b*) into a waveform such as shown in Fig. 2(*c*), the pulse 18 occurring during the blanking interval serving as a keying pulse as will be described.

The anode of pentode 11 is direct-coupled to the cathode of a triode or gating means 19, the bias on the grid of this valve being adjustable by means of a potentiometer 20. There is also applied to the grid of triode 19 the keying pulse 18 (Fig. 2(*c*)) from the differentiating circuit 16, 17. The triode 19 is arranged to be non-conducting in the absence of a keying pulse 18 and to be rendered conducting by the pulse 18. The resulting pulse at the anode of the triode 19 has the form shown in Fig. 2(*d*). The amplitude of this pulse is dependent upon the voltage level at the anode of the pentode 11 during the blanking interval 13, that is upon the voltage level 13 in Fig. 2(*a*).

The pulse of Fig. 2(*d*) is applied through a rectifier 21 and filter circuit 22 to a terminal 23 at which the required AGC voltage is generated. The voltage at the terminal 23 can be used to control the gain of the I.F. and/or R.F. stages of the television receiver.

The amplitude of the waveform at the anode of the pentode 15 is almost independent of the signal level at the anode of the pentode 11 provided that the latter exceeds a certain minimum value. The keying pulse applied to the grid of the triode 19 is, therefore, almost unaffected by variations in the signal level or contrast setting.

During the frame synchronising intervals, the circuit continues to operate satisfactorily because there is always an interval of blanking level immediately following the positive-going edge of each pulse occurring during these intervals. Consequently the keying pulses will continue to be generated throughout the frame synchronising intervals, the only difference from the operation at other times being that the keying pulses will occur at twice the line frequency. Provided that the diode 21 is arranged to operate as a true peak rectifier, the double frequency keying pulses will have no disturbing effect upon the AGC voltage. There will, therefore, be no appreciable A.C. component in the AGC voltage at the anode of the diode 21 of a frequency lower than the line frequency. For this reason the filter 22 may be given a short time constant (for example of the order of 0.02 sec.) and this enables the AGC to correct to a large extent for the rapid fading hereinbefore referred to.

Ways in which the circuit of Fig. 1 can be modified in order to operate with negative modulation signals will be understood by those skilled in the art.

I claim:

1. In an automatic gain control circuit the combination comprising a source of composite television signals including sync pulses each followed by a reference level for at least a given period which is related to the strength of the received television carrier as modulated by said composite television signals, sync separating means coupled to said source for separating the sync pulses from said composite television signal to produce pulses of substantially uniform amplitude, differentiating means coupled to the output of said sync separating means for producing a positive going pulse following the trailing edge of each of said sync pulses, gating means having a control circuit coupled to said source of composite signals and to the output of said differentiating means for passing pulse information having an amplitude substantially proportional to the amplitude of the composite television signal during the time period of each of said positive going pulses, and a filter circuit coupled to the output of said gating means.

2. In an automatic gain control circuit the combination comprising a source of composite television signals including sync pulses having a leading and trailing edge, said sync pulses being positioned on a pulse pedestal having a reference level over a given period following the sync pulse related to the strength of the carrier signal upon which said composite signals were modulated, sync separating means coupled to said source for separating the sync pulses from said composite signal to provide sync pulses of substantially uniform amplitude, differentiating means coupled to the output of the sync separating means to provide a positive going gating pulse within said given period, gating means having a control circuit coupled to the output of said differentiating means and said source of composite signals for passing a signal proportional to the amplitude of the pulse pedestal reference level during the given period, and means for filtering the output of said gating means.

References Cited in the file of this patent

UNITED STATES PATENTS

| | | |
|---|---|---|
| 2,227,056 | Blumlein | Dec. 31, 1940 |
| 2,307,375 | Blumlein et al. | Jan. 5, 1943 |
| 2,307,387 | Blumlein | Jan. 5, 1943 |